(12) United States Patent
Tesov

(10) Patent No.: US 8,861,506 B2
(45) Date of Patent: Oct. 14, 2014

(54) SHORTEST PATH DETERMINATION FOR LARGE GRAPHS

(71) Applicant: Apple Inc., Cupertino, CA (US)

(72) Inventor: Alexander Tesov, New York, NY (US)

(73) Assignee: Apple Inc., Cupertino, CA (US)

( * ) Notice: Subject to any disclaimer, the term of this patent is extended or adjusted under 35 U.S.C. 154(b) by 110 days.

(21) Appl. No.: 13/722,723

(22) Filed: Dec. 20, 2012

(65) Prior Publication Data

US 2013/0163467 A1 Jun. 27, 2013

Related U.S. Application Data

(60) Provisional application No. 61/580,531, filed on Dec. 27, 2011.

(51) Int. Cl.
*H04L 12/28* (2006.01)
*H04L 12/721* (2013.01)
*H04L 12/733* (2013.01)

(52) U.S. Cl.
CPC .............. *H04L 45/12* (2013.01); *H04L 45/126* (2013.01)
USPC ........................................................ 370/351

(58) Field of Classification Search
USPC ......... 370/235, 238, 252, 254, 255, 351, 389, 370/392
See application file for complete search history.

(56) References Cited

U.S. PATENT DOCUMENTS

| | | | |
|---|---|---|---|
| 6,305,004 B1 | 10/2001 | Tellez et al. | |
| 6,310,883 B1 | 10/2001 | Mann et al. | |
| 6,321,271 B1 | 11/2001 | Kodialam et al. | |
| 7,139,992 B2 | 11/2006 | Xing et al. | |
| 7,280,481 B2 | 10/2007 | Rong | |
| 7,406,047 B2 | 7/2008 | Koskas | |
| 7,571,411 B2 | 8/2009 | Hentschke et al. | |
| 7,656,805 B2 | 2/2010 | Vigouroux et al. | |
| 7,953,551 B2 | 5/2011 | Park et al. | |
| 8,112,733 B2 | 2/2012 | Frankle et al. | |
| 8,291,366 B2 | 10/2012 | Srivastava et al. | |
| 2002/0107711 A1* | 8/2002 | Xing et al. | 705/7 |
| 2011/0301837 A1 | 12/2011 | Wellmann | |
| 2012/0078407 A1 | 3/2012 | Hama et al. | |
| 2012/0166162 A1 | 6/2012 | Hartmann | |

FOREIGN PATENT DOCUMENTS

JP 2011227807 11/2011

OTHER PUBLICATIONS

Idwan et al, Dijkstra Algorithm Heuristic Approach for Large Graph, Journal of Applied Sciences, 5 pages, 2011.*
Chan et al, Finding Shortest Paths in Large Network Systems, University of Waterloo, 14 pages, May 2001.*
Le et al, Hierarchical Pathfinding and AI-Based Learning Approach in Strategy Game Design, Hindawi Publishing Corporation, International Journal of Computer Games Technology, vol. 2008, Article ID 873913, 12 pages, 2008.*

* cited by examiner

*Primary Examiner* — Frank Duong
(74) *Attorney, Agent, or Firm* — Adeli LLP

(57) ABSTRACT

A computer-implemented method and system are provided for determining the shortest path between two nodes in a network comprising a plurality of nodes. A non-transitory computer-readable medium is also provided that includes a plurality of instructions that, when executed by at least one electronic device, at least cause the at least one electronic device to determine the shortest path between two nodes in a network comprising a plurality of nodes.

20 Claims, 5 Drawing Sheets

SHORTEST PATH DETERMINATION FOR LARGE GRAPHS

TECHNICAL FIELD

This invention is directed to a method, system and computer-readable medium for determining routing paths.

BACKGROUND

Several solutions exist for selecting the shortest path (or minimum defined cost) between selected nodes, even in a network having a large number of interconnected nodes. Computer programs known as "road-mapping" programs provide digital maps, often complete with detailed road networks down to the city-street level. Some road-mapping programs often employ variants of shortest path algorithms (wherein "shortest" means "least cost"). Among prominent algorithms that are often used to compute shortest paths, the Djikstra algorithm finds the path with lowest cost (i.e., the shortest path) between a given source vertex (node) and every other vertex.

Many contemporary road-mapping programs use variations of the Dijkstra algorithm, including goal-directed search, in order to "guide" the shortest-path computation in the right general direction. Such variations typically involve estimating the weights of paths between intermediate locations and the destination. A good estimate reduces the number of locations and road segments that must be considered by the road-mapping program, resulting in a faster computation of shortest paths. A bad estimate can have the opposite effect, and increase the overall time required to compute shortest paths. Solutions based on the Dijkstra algorithm and other algorithms (such as A*) may often be modified to permit the inclusion of certain conditions relating to various criteria. For the purposes of giving driving directions, for instance, it might make sense to also include each intersection as a separate vertex of the graph. Although shortest paths can be generated for the quickest, shortest or preferred routes in consideration of certain criteria, computing the best route between locations may require significant computational time and resources.

It is also known to have road-mapping algorithms in which a large graph is split into smaller graphs, followed by pre-calculating the smaller graphs. Real-life graphs (e.g., graphs of streets of a country) are not easy to split so that the sub-graphs have little amount of external connections. In addition, keeping a hierarchy of multi-level sub-graphs requires several levels of splitting and is therefore quite a complicated process requiring its own splitting/pre-calculation resources. Such methods, therefore, have not proven effective for very large graphs.

The presently disclosed invention addresses these and other deficiencies in shortest path calculations and provides other advantages that are understood from the present disclosure.

SUMMARY

A computer-implemented method is provided that determines the shortest path between two nodes in a network having a plurality of nodes. The method includes receiving a graph having at least one node, with each node having coordinates for locating the node in a corresponding cell when a grid is laid over the graph. The method also includes finding connection nodes that are not contained within a cell but are connected with at least one node located in a specific cell. The graph is preprocessed by determining the shortest paths between connection nodes for a pair of cells, and the shortest path between the two nodes is searched. The shortest paths between any two nodes will go only through the nodes that are involved in the shortest paths between the connection nodes of the two cells in which the two nodes are located.

The preprocessing includes at least one of searching for the shortest path from a node in one cell to a node in another cell; identifying the nodes used in the shortest paths between the connection nodes of the two cells; and storing a list of the nodes being used in the shortest path in a record having a searchable key representing the shortest path searched for the pair of cells.

The method further includes determining in which cells start and end points are located on the graph using the coordinates of any two nodes corresponding to the start and end points. The list of nodes identified in the shortest paths between the start and end points is retrieved.

Each node may be located in a corresponding cell having a width $d_x$ and a height $d_y$. The coordinates of the two nodes are determined based on an expression:

$$\text{cell\_number} = (\text{unsigned integer})((\text{node\_}x - \text{cells\_min\_}x)/dx)*(\text{unsigned integer})((\text{cells\_max\_}y - \text{cells\_min\_}y)/dy) + (\text{unsigned integer})((\text{node\_}y - \text{cells\_min\_}y)/dy).$$

The list of nodes identified in the shortest paths may be appended with a list of the nodes located inside of the cells in which the start and end points are located. The appending includes producing an appended list of nodes. During searching of the shortest paths between the start and end points, all nodes of the graph are ignored except for those on the appended list of nodes.

A system is provided for determining the shortest path between two nodes in a network comprising a plurality of nodes. The system includes a receiving module that receives a graph having at least one node. Each node has coordinates for locating the node in a corresponding cell when a grid is laid over the graph. The system further includes a finding module that finds connection nodes that are not contained within a cell but are connected with at least one node located in a specific cell. A preprocessing module preprocesses the graph by determining the shortest paths between connection nodes for a pair of cells, and a searching module searches for the shortest path between any two nodes. The system includes a server configured to perform actions including accessing the system over the network and performing a method for determining the shortest path between two nodes as described herein.

In a system as described herein, the searching module determines in which cells start and end points are located on the graph by using the coordinates of any two nodes corresponding to the start and end points. In such a system, a retrieving module can retrieve the list of nodes identified in the shortest paths between the start and end points. Also, an appending module may be provided that produces an appended list of nodes by appending the list of nodes identified in the shortest paths with a list of the nodes located inside of the cells in which the start and end points are located. During searching of the shortest paths between the start and end points, the searching module ignores all nodes of the graph except for those on the appended list of nodes. One node may be a source node that includes a control processor for receiving network node state information and determining a near-optimum shortest path analysis.

A non-transitory computer-readable medium is provided that includes a plurality of instructions that, when executed by at least one electronic device, at least cause the at least one electronic device to determine the shortest path between two nodes in a network having a plurality of nodes. Determining the shortest path includes receiving a graph having at least one node with each node having coordinates for locating the node in a corresponding cell when a grid is laid over the graph. Connection nodes are found that are not contained within a cell but are connected with at least one node located in a specific cell. The graph is preprocessed by determining the shortest paths between connection nodes for a pair of cells. The shortest path between the two nodes is searched.

In each of the method, system and computer-readable medium described herein, the graph may comprise a map.

Other aspects of the presently disclosed method, system and computer-readable medium will become readily apparent from the following detailed description.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which.

DETAILED DESCRIPTION

Figure 1:
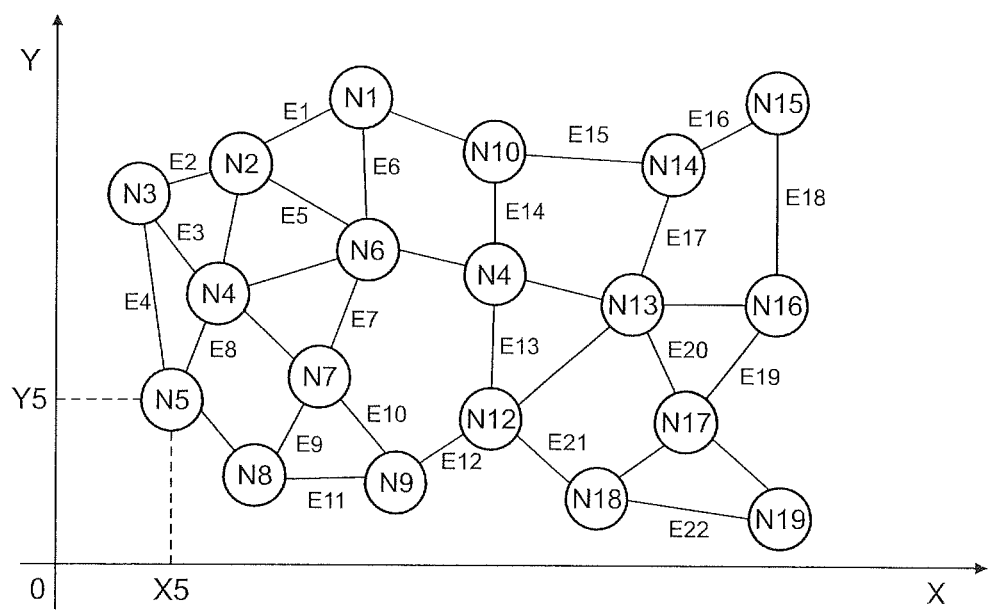
FIG. 1 shows a diagram illustrating an exemplary graph in accordance with the presently disclosed method and system.
Figure 2:
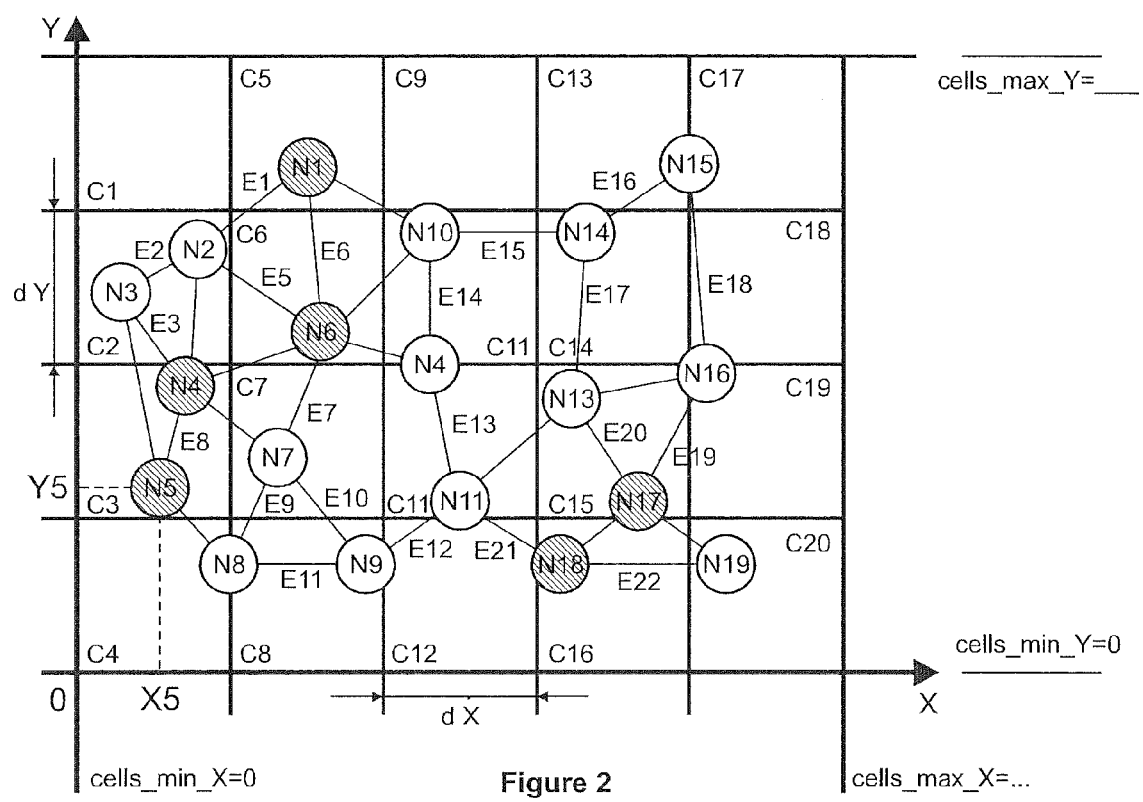
FIG. 2 shows an exemplary cell grid as applied to the exemplary graph of FIG. 1.

Now referring to the figures, wherein like numbers represent like elements, FIGS. 1 and 2 show diagrams illustrating an exemplary graph in accordance with the presently disclosed method and system. FIG. 1 shows an illustrative network of nodes N1 to N19, although it is understood that a network may comprise an infinite number of nodes. A source (originating) node can include a control processor for receiving network node state information and determining a low-cost or near-optimum shortest path analysis. A node may be directly connected to an adjoining node by a respective link or edge (shown in FIGS. 1 and 2 as edges E1 to E22, although it is understood that the number of edges in any network will vary in correspondence with the number of interconnected network nodes). FIG. 1 is illustrative of a graph of nodes connected by edges wherein each node has coordinates in a two-dimensional coordinate plane (although it is understood that each node can have coordinates in a three-dimensional space). It is understood that some nodes in a network may not be interconnected as shown.

Referring further to FIG. 2, when a grid is laid over the graph, each node is located in a corresponding cell having a width $d_x$ and a height $d_y$. By way of example, node N1 is located in cell C5, nodes N2 and N3 are located in cell C2, node N6 is located in cell C6 and so on. Some cells (such as cells C1 and C9) may remain empty. It is understood that the numbering and location of cells relative to the graph is for illustrative purposes only. For example, if the nodes have coordinates in a three-dimensional space, a corresponding cell will also have a depth (not shown).

For each cell containing one or more nodes, there may be nodes that are not contained within a cell yet are connected with a node located in a specific cell by one edge (hereinafter "connection nodes"). Referring to the example of FIG. 2, the connection nodes of cell C2 are N1, N4, N5, N6, while the connection nodes of cell C20 are N17 and N18. Any path between a node in cell C2 and a node in cell C20 goes through one of the connection nodes of cell C2 and one of the connection nodes of cell C20. Therefore, the part of the shortest path between any node in one cell and any node in another cell, that starts at a connection node of one cell and ends at a connection node of another cell, matches the shortest path between the connection nodes. Based upon this conclusion, the shortest paths between any node in one cell and any node in another cell will go only through the nodes that are involved in the shortest paths between the connection nodes of the two cells in which the two nodes are located, and not through any other nodes. Taking two cells and finding the shortest paths from each of the connection nodes of the first cell to each of the connection nodes of the other cell, the presently disclosed method and system provides for identification and storage of a list of the nodes that were used in the shortest paths. The list of nodes may be stored on a non-transitory computer-readable medium including but not limited to any known memory storage, database and/or cloud storage. While searching for the shortest path from a node in the first cell to a node in the other cell, consideration is only given to the nodes located inside the two cells and the stored nodes. The remainder of the graph's nodes are thereafter ignored to produce a small graph thereby.

Figure 3:
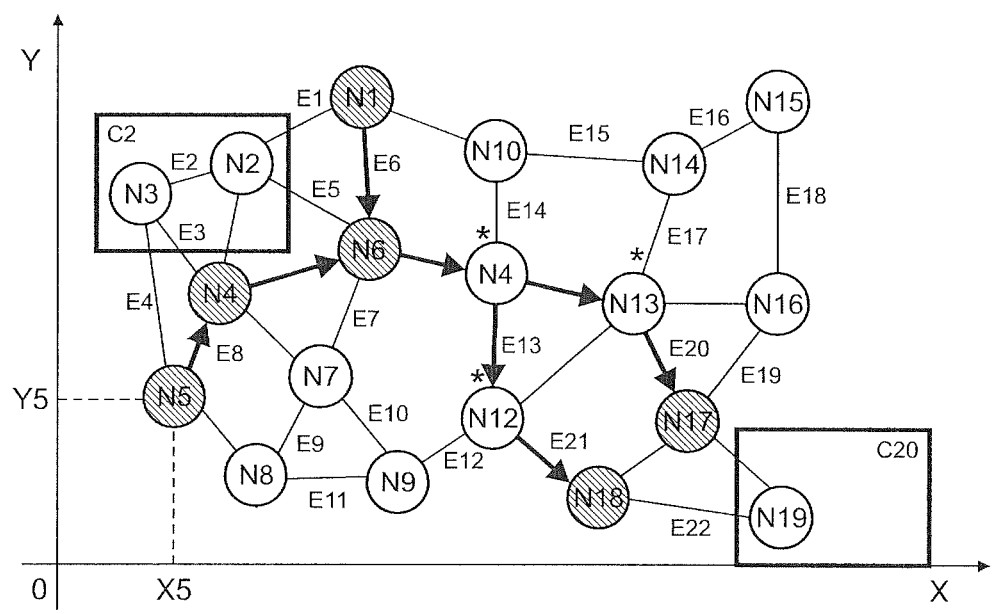
FIG. 3 shows an exemplary shortest path between connection nodes of the exemplary graph of FIG. 1.

As an example of an embodiment of the inventive method and system, reference is made to FIG. 3 which illustrates consideration of the shortest path for a pair of cells C2 and C20. During a preprocessing process, the shortest path is sought between the following connection nodes as identified in Table 1:

TABLE 1

| FROM | TO |
| --- | --- |
| N1 | N17 |
| N1 | N18 |
| N4 | N17 |
| N4 | N18 |
| N5 | N17 |
| N5 | N18 |
| N6 | N17 |
| N6 | N18 |

During the preprocessing process, the shortest path between the connection nodes is sought, for instance, by the Dijkstra algorithm, A* or any other shortest path algorithm that is amenable to practice of the presently disclosed method and system. In this example, using the Djikstra algorithm, consideration of the next "current" intersection and its distance from the starting point reveals that the shortest path for each pair of connection nodes is presented in Table 2:

TABLE 2

| FROM | TO | SHORTEST PATH |
| --- | --- | --- |
| N1 | N17 | N1, N6, N11, N13, N17 |
| N1 | N18 | N1, N6, N11, N12, N18. |
| N4 | N17 | N4, N6, N11, N13, N17 |
| N4 | N18 | N4, N6, N11, N12, N18 |
| N5 | N17 | N5, N4, N6, N11, N13, N17. |
| N5 | N18 | N5, N4, N6, N11, N12, N18 |

TABLE 2-continued

| FROM | TO | SHORTEST PATH |
|---|---|---|
| N6 | N17 | N6, N11, N13, N17 |
| N6 | N18 | N6, N11, N12, N18 |

The preprocessing process identifies the nodes that are used in the shortest paths, namely nodes N1, N4, N5, N6, N11, N12, N13, N17 and N18. This list of nodes is stored in a record (such as a database record) having a searchable key (for example, key "2→20" representing the shortest path searched from cell C2 to cell C20). The searchable key enables retrieval of a list of nodes for each pair of cells (i.e., the pairs of cells being C2→C3, C2→C4, . . . , C3→C2, C3→C4, . . . , C20→C2, C20→C19). At this point, the preprocessing process is complete, and the result of the pre-calculation is a database or like record, containing a list of nodes for each pair of cells.

During a subsequent searching process, while searching for the shortest path between two arbitrary nodes of the graph, the coordinates of the two nodes are used to determine in which cells the start and end points are located. The list of nodes can therefore be employed to get a small graph for the search (such as the graph shown in FIG. 4). As an example, if the shortest path between nodes N2 and N19 is sought, the number of the cell in which node N2 is located is identified. The numbers of the cells corresponding to the locations of nodes N2 and N19 are found according to an expression:

$$\text{cell\_number} = (\text{unsigned integer})((\text{node\_}x - \text{cells\_min\_}x)/dx)*(\text{unsigned integer})((\text{cells\_max\_}y - \text{cells\_min\_}y)/dy) + (\text{unsigned integer})((\text{node\_}y - \text{cells\_min\_}y)/dy)$$

Each "(unsigned integer)" cuts off a fractional part caused by division before multiplication and addition. The result of the expression for determining the cell number for a node gets rounded to an integer number and thereby always returns an integer number of a cell for any node.

Figure 4:
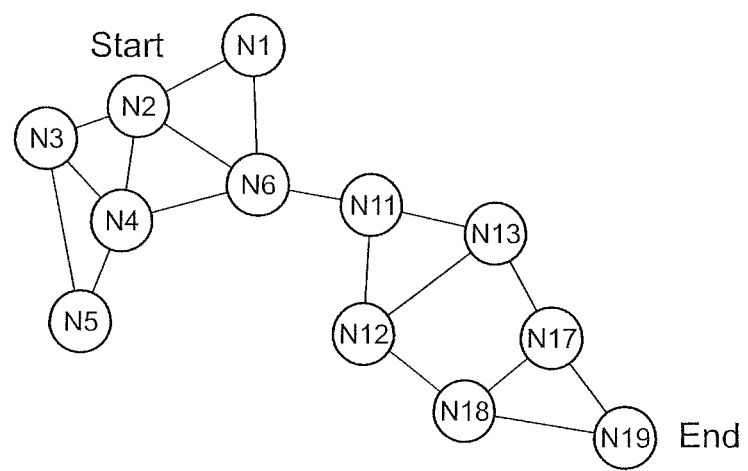
FIG. 4 shows an exemplary smaller graph in accordance with the presently disclosed method and system, derived from the exemplary graph of FIG. 1.

After this step, a search of the stored database record for key "2→20" retrieves the list of nodes identified in the shortest paths (that is, nodes N1, N4, N5, N6, N11, N12, N13, N17, N18). This list is appended with the nodes located inside of cell C2 and cell C20 (that is, nodes N2, N3, N19). While searching for the shortest path from N2 to N19, all nodes of the graph are ignored except for the nodes in the appended list (that is, nodes N1, N2, N3, N4, N5, N6, N11, N12, N13, N17, N18 and N19). Thereafter, a search for the shortest path is performed from N2 to N19 in a smaller graph, as shown in FIG. 4. The shortest path may be determined using the Dijkstra algorithm or any other shortest path algorithm that is amenable to practice of the presently disclosed method and system.

The efficiency of the disclosed method depends on the number and the size of the cells. Smaller cells correspond to fewer nodes in each cell and therefore fewer nodes in the node list of each pair of cells. Smaller cells, however, also correspond to a greater number of cells and more cell-to-cell combinations for pre-calculation. The size of the cells may therefore be selected so as to optimally use available time and resources for the pre-calculation process and the shortest path search. As an example, a graph of streets may be split into 1000 cells so as to enable expedited searching of long-distance walking, running and/or biking routes.

It is understood that sometimes a cell does not have connection nodes at all (e.g., streets on an island and all of the island is located in a single cell). In this case, all node lists for the shortest paths between this cell and other cells will be empty. If the start node or the end node is located in such a cell, the application can return a "path not found" without any computation unless the start and end nodes are located in the same, isolated cell.

Figure 5:
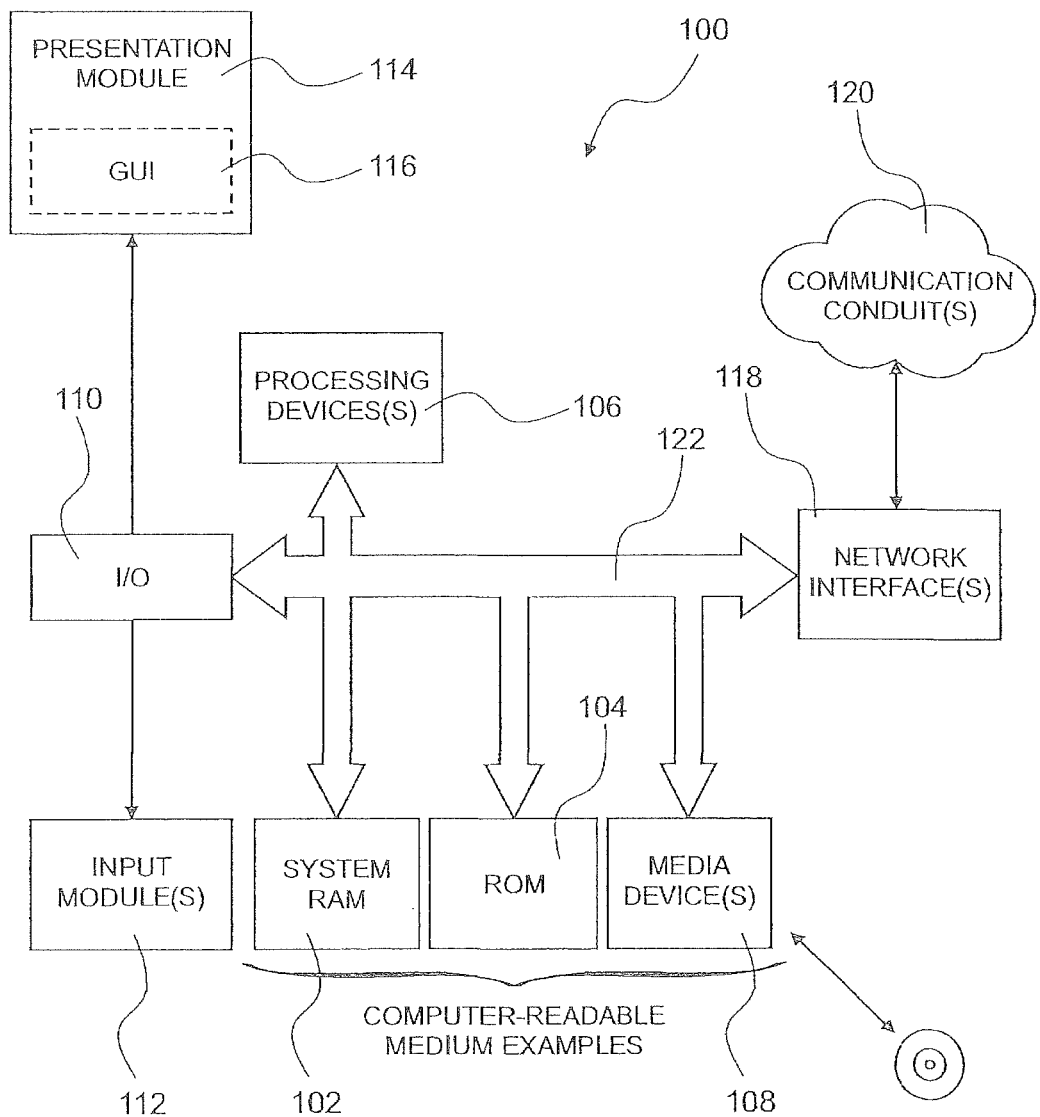
FIG. 5 shows an exemplary computing environment in which embodiments of the presently disclosed method and system may be implemented.

The various techniques described herein may be implemented in connection with hardware or software or, where appropriate, with a combination of both. FIG. 5 sets forth illustrative electrical data processing functionality 100 that can be used to implement any aspect of the functions described above, including implementation in connection with a computing device (including a mobile networking apparatus) that includes hardware, software, or, where appropriate, a combination of both. FIG. 5 sets forth illustrative processing functionality 100 that can be used to implement aspects of the functions described herein. In one case, the processing functionality 100 may correspond to any type of computing device that includes one or more processing devices. The computing device can include any type of computer, computer system or other programmable electronic device, including a client computer, a server computer, a portable computer (including a laptop and a tablet), a hand-held computer, a mobile phone (including a smart phone), a gaming device, an embedded controller and any combination and/or equivalent thereof (including touchless devices). Moreover, the computing device may be implemented using one or more networked computers, e.g., in a cluster or other distributed computing system. It is understood that the exemplary environment illustrated in FIG. 5 is not intended to limit the present disclosure, and that other alternative hardware and/or software environments may be used without departing from the scope of this disclosure.

For clarity, as used herein, the term "server" includes one or more servers. A server can include one or more computers that manage access to a centralized resource or service in a network. A server can also include at least one program that manages resources (for example, on a multiprocessing operating system where a single computer can execute several programs at once). Further, the terms "computing device", "computer device", "computer" and "machine" are understood to be interchangeable terms and shall be taken to include any collection of computing devices that individually or jointly execute a set (or multiple sets) of instructions to perform any one or more of the methods discussed herein.

As used herein, the terms "mobile phone", "mobile device", "wireless mobile device" and "wireless device" may be used interchangeably, in the singular or plural, to refer to smartphones, PDAs, tablets, near-field communication devices, devices with applications implemented at least partly using a cloud service and any other complementary and equivalent devices. The processing functionality 100 can include volatile memory (such as RAM 102) and/or non-volatile memory (such as ROM 104 as well as any supplemental levels of memory, including but not limited to cache memories, programmable or flash memories and read-only memories). The processing functionality can also include as one or more processing devices 106 (e.g, one or more central processing units (CPUs), one or more graphics processing units (GPSs), one or more microprocessors (μP) and similar and complementary devices) and optional media devices 108 (e.g, a hard disk module, an optical disk module, etc.).

The processing functionality 100 can perform various operations identified above with the processing device(s) 106 executing instructions that are maintained by memory (e.g., RAM 102, ROM 104 or elsewhere). The disclosed method and system may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the presently disclosed method and system. When implemented on a general-purpose processor, the program code combines with the processor to provide a unique apparatus that operates to invoke the functionality of the presently disclosed method and system. Additionally, any storage techniques used in connection with the presently disclosed method and/or system may invariably be a combination of hardware and software.

The processing functionality 100 also includes an input/output module 110 for receiving various inputs from a user (via input modules 112) and for providing various outputs to the user. One particular output mechanism may include a presentation module 114 and an associated graphical user interface (GUI) 116 incorporating one or more I/O devices (including but not limited to a display, a keyboard/keypad, a mouse and/or other pointing device, a trackball, a joystick, a haptic feedback device, a motion feedback device, a voice recognition device, a microphone, a speaker, a touch screen, a touchpad, a webcam, 2-D and 3-D cameras, gesture recognitions devices, device incorporating touchless technologies and similar and complementary devices that enable operative response to user commands that are received at a computing device).

Otherwise, user input may be received via a computing device coupled to another computing device over a network. The processing functionality 100 can also include one or more network interfaces 118 for exchanging data with other devices via one or more communication conduits 120. One or more communication buses 122 communicatively couple the above-described components together. Bus 122 may represent one or more bus structures and types, including but not limited to a memory bus or memory controller, a peripheral bus, a serial bus, an accelerated graphics port, a processor or local bus using any of a variety of bus architectures and similar and complementary devices. This configuration may be desirable where a computing device is implemented as a server or other form of multi-user computer, although such computing device may also be implemented as a standalone workstation, desktop, or other single-user computer in some embodiments. In such configuration, the computing device desirably includes a network interface in operative communication with at least one network. The network may be a LAN, a WAN, a SAN, a wireless network, a cellular network, radio links, optical links and/or the Internet, although the network is not limited to these network selections. It will be apparent to those skilled in the art that storage devices utilized to provide computer-readable and computer-executable instructions and data can be distributed over a network. The computing device can operate under the control of an operating system that executes or otherwise relies upon various computer software applications. For example, a database management system (DBMS) may be resident in the memory to access one or more databases (not shown). The databases may be stored in a separate structure, such as a database server, connected, either directly or through a communication link, with the remainder of the computing device. Moreover, various applications may also execute on one or more processors in another computer coupled to the computing device via a network in a distributed or client-server computing environment.

As used herein, a "user" may be a single user or a group of users. As used herein, the term "user" (or "user device", "client device", "network-connected device", "electronic device" or "device") can refer to any electronic apparatus configured for receiving control input and configured to send commands or data either interactively or automatically to other devices. A user device can be an instance of an online user interface hosted on servers as retrieved by a user. As used herein, the term "process" or "method" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously.

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the disclosed method, system and computer-readable medium have been illustrated and described, it will be understood that various changes, additions and modifications can be made without departing from the spirit and scope of the present disclosure. Accordingly, no limitation should be impose on the scope of the presently disclosed invention, except as set forth in the accompanying claims.

What is claimed is:

1. A computer-implemented method for determining the shortest path between two nodes in a network comprising a plurality of nodes, the method comprising:
   receiving a graph comprising at least one node with each node having coordinates for locating the node in a corresponding cell when a grid is laid over the graph; finding connection nodes that are not contained within a cell but are connected with at least one node located in a specific cell;
   preprocessing the graph by determining the shortest paths between connection nodes for a pair of cells; and
   searching for the shortest path between any two nodes;
   wherein the shortest paths between the two nodes will go only through nodes that are involved in the shortest paths between the connection nodes of the two cells in which the two nodes are located.

2. The method of claim 1, wherein the preprocessing includes at least one of:
   searching for the shortest path from a node in one cell to a node in another cell;
   identifying the nodes used in the shortest paths between the connection nodes of the two cells; and
   storing a list of the nodes being used in the shortest path in a record having a searchable key representing the shortest path searched for the pair of cells.

3. The method of claim 2, further comprising determining in which cells start and end points are located on the graph using the coordinates of any two nodes corresponding to the start and end points and retrieving the list of nodes identified in the shortest paths between the start and end points.

4. The method of claim 3, wherein each node is located in a corresponding cell having a width $d_x$ and a height $d_y$ and the coordinates of the two nodes are determined based on an expression:

cell_number=(unsigned integer)((node_x−cells_min_x)/dx)*(unsigned integer)((cells_max_y−cells_min_y)/dy)+(unsigned integer)((node_y−cells_min_y)/dy).

5. The method of claim 3, further comprising appending the list of nodes identified in the shortest paths with a list of the nodes located inside of the cells in which the start and end points are located, wherein the appending includes producing an appended list of nodes, and wherein, during searching of the shortest paths between the start and end points, all nodes of the graph are ignored except for those on the appended list of nodes.

6. The method of claim 1, wherein the graph comprises a map.

7. A system for determining the shortest path between two nodes in a network comprising a plurality of nodes, the system comprising:
  a receiving module that receives a graph including at least one node with each node having coordinates for locating the node in a corresponding cell when a grid is laid over the graph;
  a finding module that finds connection nodes that are not contained within a cell but are connected with at least one node located in a specific cell;
  a preprocessing module that preprocesses the graph by determining the shortest paths between connection nodes for a pair of cells;
  a searching module that searches for the shortest path between any two nodes; and
  a server configured to perform actions comprising:
    accessing the system over the network; and
    performing the method of claim 1.

8. The system of claim 7, wherein the preprocessing module performs at least one of:
  searching for the shortest path from a node in one cell to a node in another cell;
  identifying the nodes used in the shortest paths between the connection nodes of the two cells; and
  storing a list of the nodes being used in the shortest path in a record having a searchable key representing the shortest path searched for the pair of cells.

9. The system of claim 8, wherein storing the nodes includes storing the list in a record having a searchable key representing the shortest path searched for the pair of cells.

10. The system of claim 9, wherein the searching module determines in which cells start and end points are located on the graph by using the coordinates of any two nodes corresponding to the start and end points, and a retrieving module retrieves the list of nodes identified in the shortest paths between the start and end points.

11. The system of claim 10, wherein each node is located in a corresponding cell having a width $d_x$ and a height $d_y$ and the searching module determines the coordinates of the two nodes based on an expression:

cell_number=(unsigned integer)((node_x−cells_min_x)/dx)*(unsigned integer)((cells_max_y−cells_min_y)/dy)+(unsigned integer)((node_y−cells_min_y)/dy).

12. The system of claim 10, wherein an appending module produces an appended list of nodes by appending the list of nodes identified in the shortest paths with a list of the nodes located inside of the cells in which the start and end points are located, and wherein, during searching of the shortest paths between the start and end points, the searching module ignores all nodes of the graph except for those on the appended list of nodes.

13. The system of claim 7, wherein one node is a source node that includes a control processor for receiving network node state information and determining a shortest path analysis.

14. The system of claim 7, wherein the graph comprises a map.

15. A non-transitory computer-readable medium comprising a plurality of instructions that, when executed by at least one electronic device, at least cause the at least one electronic device to determine the shortest path between two nodes in a network comprising a plurality of nodes, wherein determining the shortest path includes:
  receiving a graph comprising at least one node with each node having coordinates for locating the node in a corresponding cell when a grid is laid over the graph;
  finding connection nodes that are not contained within a cell but are connected with at least one node located in a specific cell;
  preprocessing the graph by determining the shortest paths between connection nodes for a pair of cells; and
  searching for the shortest path between the two nodes;
  wherein the shortest paths between the two nodes will go only through the nodes that are involved in the shortest paths between the connection nodes of the two cells in which the two nodes are located.

16. The non-transitory computer-readable medium of claim 15, wherein the preprocessing includes at least one of:
  searching for the shortest path from a node in one cell to a node in another cell;
  identifying the nodes used in the shortest paths between the connection nodes of the two cells; and
  storing a list of the nodes being used in the shortest path in a record having a searchable key representing the shortest path searched for the pair of cells.

17. The non-transitory computer-readable medium of claim 16, wherein the instructions further cause the at least one electronic device to:
  determine in which cells start and end points are located on the graph using the coordinates of any two nodes corresponding to the start and end points; and
  retrieve the list of nodes identified in the shortest paths between the start and end points.

18. The non-transitory computer-readable medium of claim 17, wherein each node is located in a corresponding cell having a width $d_x$ and a height $d_y$ and the coordinates of the two nodes are determined based on an expression:

cell_number=(unsigned integer)((node_x−cells_min_x)dx)*(unsigned integer)((cells_max_y−cells_min_y)/dy)+(unsigned integer)((node_y−cells_min_y)/dy).

19. The non-transitory computer-readable medium of claim 17, wherein the instructions further cause the at least one electronic device to:
  produce an appended list of nodes by appending the list of nodes identified in the shortest paths with a list of the nodes located inside of the cells in which the start and end points are located; and
  ignore all nodes of the graph during searching of the shortest paths between the start and end points, except for those on the appended list of nodes.

20. The non-transitory computer-readable medium of claim 15, wherein the graph comprises a map.

* * * * *